US006697973B1

(12) United States Patent
Baumeister, IV et al.

(10) Patent No.: US 6,697,973 B1
(45) Date of Patent: Feb. 24, 2004

(54) HIGH AVAILABILITY PROCESSOR BASED SYSTEMS

(75) Inventors: Theodore Baumeister, IV, Raleigh, NC (US); Patrick Leo Caporale, Morrisville, NC (US); Christopher Anthony Widmann, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 09/650,988

(22) Filed: Aug. 30, 2000

Related U.S. Application Data
(60) Provisional application No. 60/169,634, filed on Dec. 8, 1999.

(51) Int. Cl.[7] .............................................. G06F 11/00
(52) U.S. Cl. ............................ 714/55; 714/23; 714/45
(58) Field of Search ............................. 714/55, 56, 23, 714/45, 723; 710/266, 267

(56) References Cited

U.S. PATENT DOCUMENTS

| 5,513,319 A | * | 4/1996 | Finch et al. ................ 714/55 |
| 6,012,154 A | * | 1/2000 | Poisner ....................... 714/55 |
| 6,061,810 A | * | 5/2000 | Potter ......................... 714/23 |
| 6,101,617 A | * | 8/2000 | Burckhartt et al. ........... 714/23 |
| 6,505,298 B1 | * | 1/2003 | Cerbini et al. ................ 713/1 |
| 6,510,529 B1 | * | 1/2003 | Alexander et al. ........... 714/11 |

FOREIGN PATENT DOCUMENTS

| JP | 406035737 A | * | 2/1994 | ............ G06F/11/14 |

* cited by examiner

Primary Examiner—Scott Baderman
(74) Attorney, Agent, or Firm—Joscelyn G. Cockburn

(57) ABSTRACT

A microprocessor based system, such as a Personal Computer (PC), server, router, word processor or like devices, includes circuit arrangement that monitors the processor for a heartbeat pulse. If the heartbeat pulse is not sensed within a specified time interval the circuit arrangement issues a Soft Reset signal (Unmasked Interrupt) that causes the microprocessor to execute a program that logs the current state of selected entities within the system and a Hard Reset Pulse that resets the system hardware. The log can be used to identify the cause of a problem, whereas the Hard Reset causes the system to reboot and continue normal operation.

10 Claims, 3 Drawing Sheets

HIGH AVAILABILITY PROCESSOR BASED SYSTEMS

CROSS-REFERENCE TO RELATED PATENT APPLICATIONS

This application relates to Provisional Patent Application Serial No. 60/169,634 which is incorporated herein by reference. In addition, the present application claims the priority of said Provisional Application Serial No. 60/169,634, filed Dec. 8, 1999.

BACKGROUND OF THE INVENTION

1. Field of the Invention

The present invention relates to processor based systems in general and in particular to processor based systems whose services are required all of the time and are referred to in the document as High Available Systems.

2. Prior Art

Today's society is so dependent on technology that any glitch or failure in the associated machines or systems could result in catastrophic consequences.

Communications is one of the technological areas of uttermost importance. Communications include interconnecting networks, such as the internet, and the machines and/or subsystems that are connected thereto. The communications area provides the mechanisms for users to communicate via desktop systems such as computers, word processors etc.

In addition to the desktop systems, there are infrastructure systems that are required to facilitate the interconnection and/or provide shared services. The systems are processor based and may include devices such as web servers, printers, networking routers, switches, pbx, phone systems etc. Such systems are placed at high availability locations and must run continuously or if a hardware failure occurs recover from it automatically.

Even though it would be desirable to have fail safe systems, this is not possible in the real world. Machines do break down and when one does the next best thing is to be able to troubleshoot a failed system to detect the cause of the failure and to make sure the same problem does not affect the system repeatedly.

To meet the performance goal of these processor based systems manufacturers provide them with a bundle of RAS (Reliability, Availability and Serviceability) functions. The RAS function include a hardware reset feature that handles hardware failures without intervention from an operator.

To provide the hardware reset RAS function a single watchdog timer circuit is placed within the processor based system. Its sole function is to restart the system if it detects a hang or failure. Most watchdog timer systems work in a mode where the microprocessor must periodically interrupt the watchdog timer by some sort of read or write operation. This operation will restart a countdown timer contained within the watchdog timer circuit. If this timer reaches zero (or some value if it counts up), it will generate a signal which will reset the processor and all of its support components. This only occurs if and only if the microprocessor has not interrupted the watchdog timer within a set time interval. In High Availability microprocessor based subsystems such as networking hardware, servers and the like, especially when the unit is not in continual human contact, this restart is necessary to bring the box back online. User intervention to restart a hung subsystem is undesirable since the system may be inaccessible, or will require excessive time to get human intervention to occur.

Even though the single watchdog timer works well for its intended purpose, it is plagued with several problems. First when a microprocessor based system is rebooted on a watchdog-timeout the reboot is very destructive to the contents of memory, registers and microprocessor stack contents, preventing the software from logging what may have gone wrong or why the system had to be rebooted.

Another problem with the single watchdog timer is that it is only effective with hardware associated failures. Quite often the failures that cause microprocessor based systems to hang are software related. For example, software bugs or a runaway pointer in memory could cause the system to get a wrong instruction and then lock up. Even hardware errors such as a bad memory location can cause a system hang, forcing a lock up. For these types of errors the single watchdog timer circuit is ineffective.

The services of a trained technician is required to troubleshoot and identify the problems that cause the lock up. A lot of expensive equipment and technician time are also required to identify and correct the problem. Even with well trained technicians and sophisticated instruments sometimes the condition that causes a hung system cannot be replicated. The solution is to discard the unit as being defective. The cost associated with abandoning the unit or troubleshooting to identify the cause of the error can be prohibitively high and unacceptable.

In view of the above there is a need for a RAS (Reliability, Availability and Serviceability) system that solves the problems of the prior art single watchdog timer system. The present invention (set forth herein) provides such a system.

SUMMARY OF THE INVENTION

The RAS system of the present invention includes cascaded watchdog timer circuits. The first watchdog timer circuit trips on the microprocessor inactivity. The first watchdog timer circuit generates a non-maskable interrupt (termed a Soft Reset or system management interrupt) to the processor. The interrupt wakes the processor enough to recover from the hung state and logs the current status of the system. The processor logs the contents of memory for later analysis, copies the register stack to help programmers determine where the system hung, and also finds which interfaces or devices may have been involved in the hang by querying registers. All of this will improve the software and hardware designer's ability to find bugs and the user's ability to detect configuration errors. Once this logging is complete, the system allows the second watchdog timer to expire and generates a hard reset signal that is used to reset the hardware. If the processor does not wake after the first watchdog timer triggers the non-maskable interrupt or system management interrupt, due to a very complex hang, the second watchdog timer will trigger anyway on inactivity and then reset the box with a hard reset.

Hardware circuits are provided to ensure that the cascaded watchdog timer circuits are activated sequentially, reset on a reset condition and inhibit race condition when the reset is generated.

Software is also provided to handle intermediate system query step to interrogate and log hung system status.

The foregoing features and advantages of the invention will be more fully described in the accompanying drawings.

DESCRIPTION OF THE PREFERRED EMBODIMENT

Figure 1:
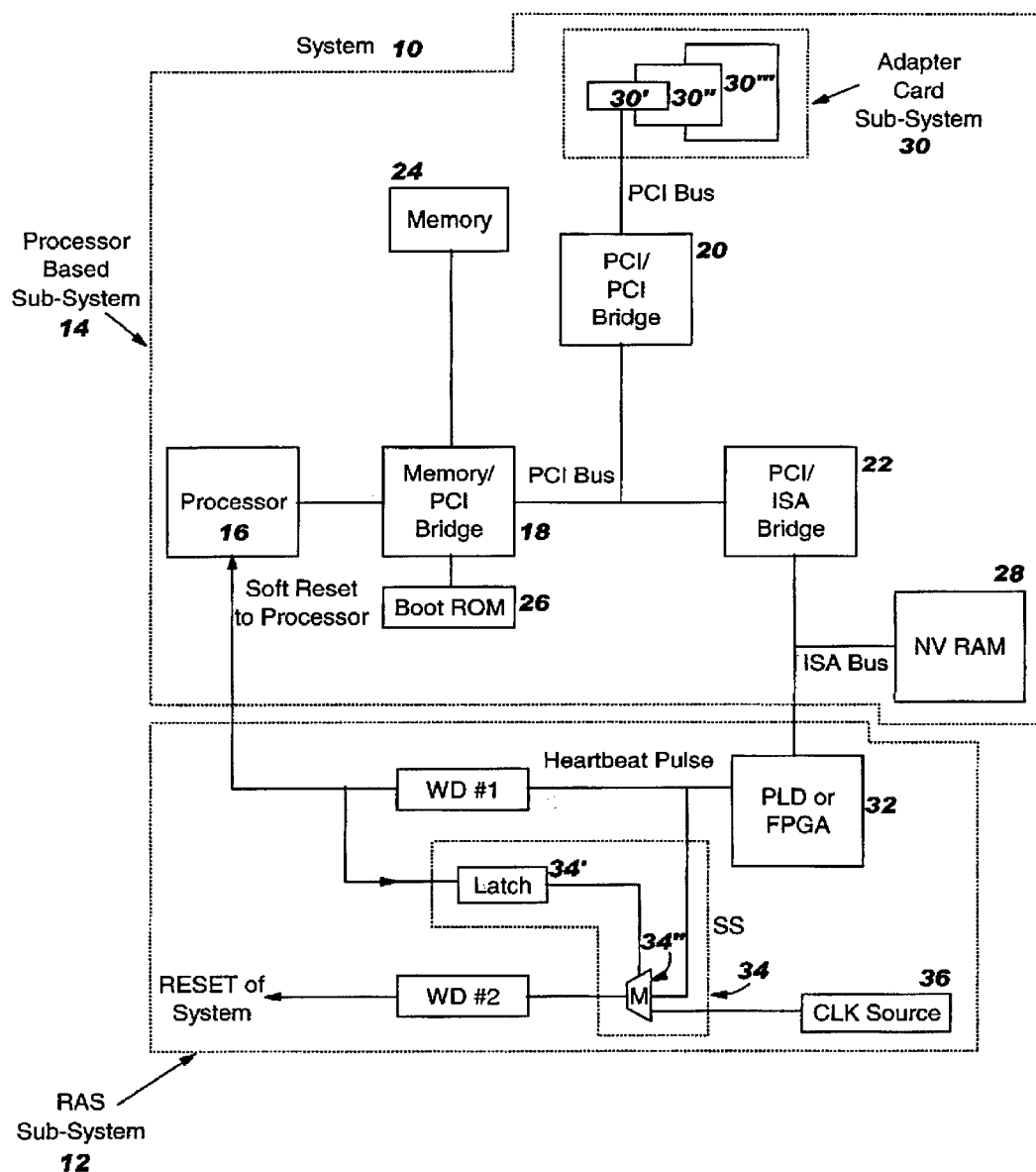
FIG. 1 shows a block diagram of a microprocessor based system according to the teachings of the present invention.

FIG. 1 shows a block diagram of the system according to the teachings of the present invention. The system 10 includes the reliability, availability, serviceability (RAS) subsystem 12 operatively coupled to the processor base subsystem 14. As is used in this document, microprocessor and processor are used interchangeably. For purposes of description the processor based subsystem 14 is described as a communications router. However, this should not be construed as a limitation in the scope of the present invention since it is well within the skill of one skilled in the art to use the teachings described herein in other types of processor based systems. The RAS subsystem 12 monitors the processor based subsystem 14 and when a fault occurs such as a processor hung the processor is forced to capture and provide an image of the state of the system when the fault occurs. The image is provided by the processor logging the state of selected devices within the system. The processor based subsystem 14 provides a particular type of function for the user. In the processor based system of FIG. 1 a router function is provided. Other types of function may include server etc.

Still referring to FIG. 1, the processor based subsystem 14 includes processor 16, host bridges 18, 20 and 22, memory 24, boot ROM 26, NVRAM 28 and adapter card subsystem 30. The named components are coupled as shown in the figure. Even though a real system would contain additional components for purposes of the description only those features of the router which are necessary to understand applicant's invention are disclosed. The processor 16 is the controller for the router. The Memory/PCI bridge 18 couples the processor to memory 24, boot ROM 26 and PCI bus. Memory/PCI bridge 18 includes circuit which interfaces the respective buses and provides the mechanism whereby data can be exchanged between the devices connected to the respective bus. The use of bridges in this environment is well known. Therefore, a detailed description of the bridges will not be given.

The PCI/PCI bridge 20 couples the PCI bus to adapter card subsystem 30. The adapter card subsystem 30 is the mechanism that connects the router to the communications network (not shown). In a real system each of the adapters 30', 30" and 30'" in the adapter card subassembly 30 connects the PCI bus to the communications network. It should be noted that if system 10 was not a router the adapter card sub-system would connect to the function which system 10 provides. PCI/ISA Bridge 22 interconnects the PCI bus to the ISA Bus. The ISA Bus is a slower bus than the PCI Bus. Therefore, any other types of relatively slow and inexpensive buses could be used to replace the ISA Bus. The NVRAM 28 and Programmable Logic Device (PLD) or Field Programmable Gate Array (FPGA) 32 are connected to the ISA Bus. The PLD or FPGA contains general purpose registers that the processor can access via the ISA bus. Also registers which the processor accesses is maintained in NVRAM 28. One of the registers in NVRAM 28 is a control register with a bit that is set at initialization time if the processor is to log the contents of the system when the unmask interrupt on the line labeled Soft Reset to Processor is generated by the RAS subsystem 12.

As will be explained hereinafter the PLD or FPGA accepts the register write from the processor and decodes it to determine whether the Heartbeat pulse should be generated. The Heartbeat Pulse is the signal that informs the watchdog timers as to the status of the processor. If the Pulse is not sensed within a predetermined time interval the watchdog timers assume that the processor is hung and initiate corrective action set forth herein. Although the PLD or FPGA actually issues the heartbeat Pulse, if the processor does not first execute the register write there would be no pulse generated. Stated another way, the Heartbeat Pulse is an indication that the processor 16 is in operational state. When the processor is not in operational state the heartbeat pulse is not generated and the fault recovery routine according to the teachings of the present invention is initiated and carried out. The Boot ROM 26 stores the program which processor 16 executes when it is forced to read the program due to the Unmasked Interrupt signal generated by watchdog (WD) timer 1.

Still referring to FIG. 1, the RAS subsystem 12 includes watchdog timer circuit (WD1), switch subsystem 34 (SS34), PLD or FPGA 32, clock source 36 and watchdog timer (WD#2). The watchdog timers are off the shelf items which can be purchased from any OEM (Original Equipment Manufacturer). For example, the watchdog timing circuit MAX 6301, 6302, 6303 or 6304 are suitable. These watchdog timing circuits are manufactured and sold by Maxim Integrated Products, 120 San Gabriel Drive, Sunnyvale, Calif. 94086. Of course any of the watchdog timing circuits designed by other manufacturers can be used.

Functionally, a watchdog timer is like a stopwatch which counts down from a present value, say 30 seconds. At least one time during this 30 second interval the system must communicate with the watchdog timer to signify that it is alive and well. This signal is referred to as the Heartbeat Pulse (FIG. 1) which resets the timer's count and it begins counting again. The premise Is that if the watchdog timer finishes its count and no heartbeat signal is received, it assumes the system has hung and that it needs to take action by completely resetting the hardware to try and recover the system. A hard reset is issued and the system will then try to reboot and come back online. These reboots can use significant chunks of time, sometimes taking as much as 30 minutes to bring a large server back online. But they operate unattended, preventing a system manager from having to show up and reset the failed system.

Still referring to FIG. 1 the output from WD#1 is connected by switch system 34 to WD#2. The function of switch system 34 is to switch the input of WD#2 to clock source 36 or the heartbeat pulse outputted from PLD or FPGA 32. In the preferred embodiment of this invention the switch subsystem 34 includes latch 34' and multiplexer (MUX 34"). Of course other types of switch systems other than the latch and MUX could be used for switching the input of WD#2 without departing from the spirit or scope of the present invention.

Figure 2:
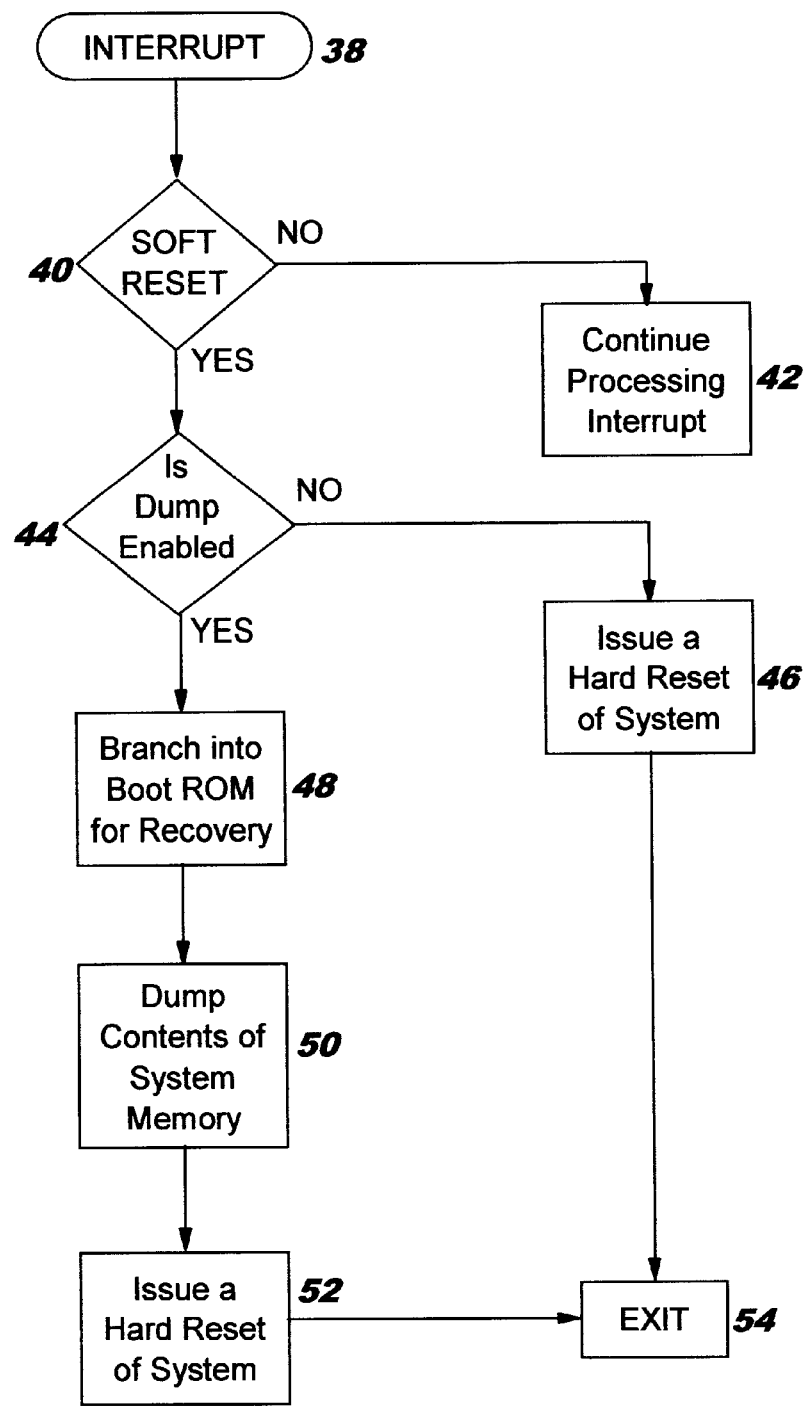
FIG. 2 shows a flowchart of the process that captures the status of the hung system and resets the hardware.

FIG. 2 shows a flowchart of the process once the Unmask interrupt is generated following the expiration of WD#1. In 38 the processor receives an interrupt. The process then descends into block 40 where the processor tests to see if this is a Soft Reset. The processor identifies a Soft Reset if the interrupt which it receives is a special interrupt that is unmaskable. If the interrupt is not the Soft Reset, the processor enters block 42 whereat it continues processing the interrupt in the normal fashion. If the interrupt is a Soft Reset (block 40), the process descends along the Yes path into block 44. In block 44 the processor tests to see if the dump function is enabled. The processor tests for this function by accessing a control register in NVRAM 28 and if a particular bit is set in that control register then the dump function is enabled. As stated before the bit in this register would probably be set at system initialization time. If the bit in the control register is not set this indicates that the dump enabled function is deactivated and the process enters block 46. In block 46 a hard reset of the system is issued. As will be explained subsequently the Hard Reset on the line labeled Reset of System on FIG. 1 is issued by WD#2.

Figure 3:
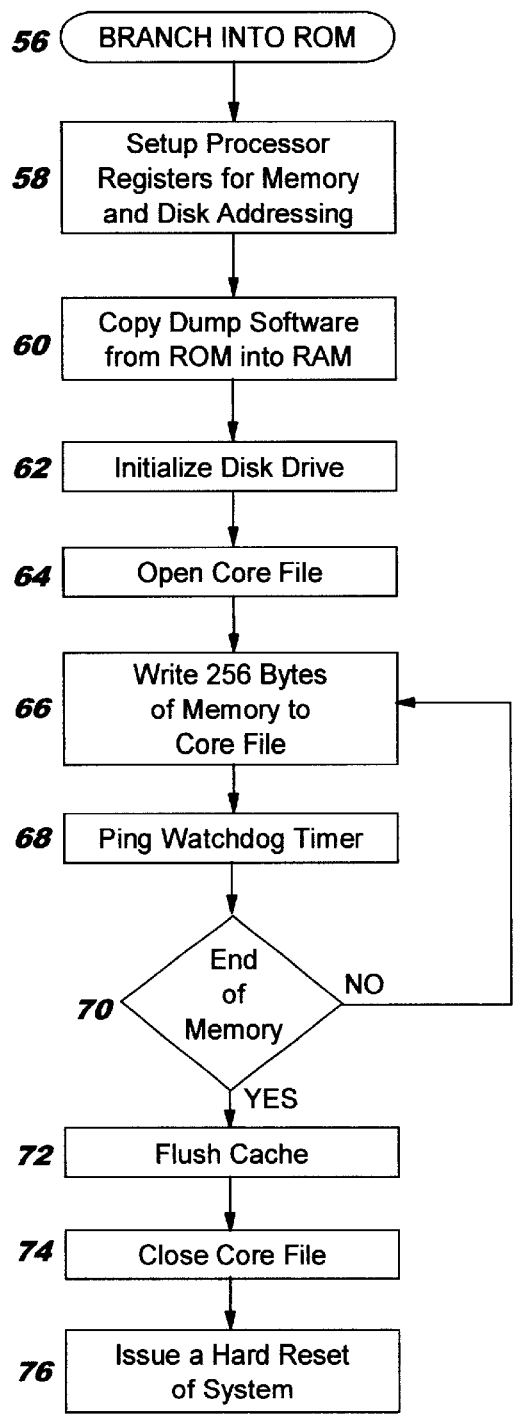
FIG. 3 shows a flowchart of the program that controls the logging routine in which memory is dumped to disk.

Referring again to FIG. 2 and to block 44 in particular, if the control bit is set the dump function is enabled and the process exits along the Yes path into block 48. In block 48 the processor is forced to access the boot ROM to execute the code contained therein for recovering the system. FIG. 3 below describes the flow of the program which is in the boot ROM to effectuate the recovery process. The program then descends into block 50 where the state of the system such as a dump of the memory is undertaken. The process then descends into block 52 where the previously described hard reset is issued. The process then exits via exit block 54.

FIG. 3 shows a flowchart for the program which is stored in the Boot ROM and is executed after the first watchdog timer has expired.

Once the first watchdog has expired, and the software determines that a memory dump to disk needs to take place, it branches into the Boot ROM 56 for execution. The first thing that is executed is code that sets up the internal processor, and memory controller registers to allow memory and PCI accesses 58. Next the Boot ROM code Is copied in RAM for faster execution 60. Once the boot ROM code is successfully loaded into RAM, the code will initialize the hard disk drive 62, and create a file named "core" that will contain the memory dump 64. It then enters into a loop sequence where 256 bytes of memory are written to the "core" file 66, then the software pings the watchdog timer 68. Since the first watchdog timer has expired, the external latch 34' will now route the pulse to the second watchdog timer WD#2. After the watchdog ping has occurred, the software determines if it has reached the end of memory 70. If not, the next 256 bytes are written and so forth. If the entire memory has been written to disk, the software flushes the cache to insure that all data has been committed to disk 72. It will then close the "core" file 74. Lastly now that the memory contents have been completely saved for later review, the software issues a hardware reset of the entire system 76.

In operation, watchdog timer WD#1 will generate the Soft Reset or non-maskable interrupt to processor 16 if the heartbeat pulse is not sensed within a set time interval. This interrupt is the highest interrupt class a processor accepts. It is not maskable (i.e. cannot be turned off) and it forces the processor to leave where it is currently stuck and a jump to a memory location usually in the boot ROM and start executing code. Placing code in this location to go out and probe the system, store the contents of memory, the registers in the processor, the location in memory where at the processor was hung or any relevant system registers to a storage medium such as a flash, compact flash, hard file, NVRAM or some other storage medium for later analysis by the programmers and system designers will help to quickly identify any of the problems this system experiences and help resolve these bugs or fix the hardware to prevent crashes from occurring in the future. After storing this data, the second watchdog timer WD#2 generates the system reset signal which is used to reset the system.

If the system is so badly hung that the non-maskable interrupt or soft reset does not restore the system to a level which can investigate and store the contents of registers or memory, the second watchdog time will trip, causing the system to go through a hard reset. This fail safe prevents the system from hanging in case there are errors so catastrophic that the processor is placed in a state which cannot proceed to investigate what went wrong.

As stated before watchdog timer WD#1 functions to generate an interrupt which is utilized by the processor 16. The second watchdog timer WD#2 starts counting at this time as a fail safe, preventing the system from hanging in this state, while the processor is awake and to help store and identify the source of the prior hang.

In more detail, on initial system bring-up, the processor starts sending Heartbeat Pulses to the watchdog timer. This heartbeat will be fed into watchdog timer WD#1 and the MUX. The MUX on initial startup will feed clock source 36, such as a simple crystal oscillator output, into watchdog timer WD#2, preventing it from triggering. When the Heartbeat stops being sent by the processor such as in the event of a system hang, or failure, watchdog timer WD#1 will expire, generating a Soft Reset or nonmaskable interrupt to processor 16. When this occurs the latch 34' trips switching WD#2 input from the clock source to the Heartbeat signal. This signal will need to be sent by the code which captures the state of the system by storing the contents of memory, registers, etc. If the processor fails to wake upon receipt of this interrupt or Soft Reset the second watchdog timer (WD#2) will expire and generate the Hard System Reset that resets the entire system. If the processor does wake up and when it completes its dump of memory and registers it can then let the watchdog timer expire by not sending the heartbeat pulses, and then the system will proceed through its hard reset and restart as normal.

The second reset is also required after the explore and capture phase of the initial system failure. This is required so the system can truly be reset to a known state, one in which all hardware will be at a point to restart the system and attempt to return to normal operational status. Not only this, but the latch and watchdog timers need to be reset in order to restore the cascading nature of their function. If the system was to just restart operation after the soft reset or non-maskable interrupt, the cascading structure will not be in place since the watchdog timers have not been reset themselves.

Once the system is operational again (or even non-operational), the programmers and designers of the system can download the data collected and stored on the system after the initial hang to help identify and fix the system so that future crashes will not occur. This is very important since most system failures in the field need to be simulated by the manufacturer with expensive test hardware attached to try to capture the state of the system when this hang occurs. It could be days or weeks between failures caused by software bugs or memory cell errors. If this data is captured and then analysed this failure can be identified and resolved much quicker and with less expense to both the customer and the supplier. It should be noted that the heartbeat pulses results from a register that is read or written by the processor and hardware generates a signal that is sent to the watchdog timers.

This cascading watchdog design can be implemented with either discreet logic as shown in FIG. 1 and as described above or can be implemented in silicon in an FPGA, PLD or ASIC form. To be fully functional this design incorporates both hardware and software. The dump and the examination of system memory and registers requiring code to read and store this information. How this is done is left to the programmer and is system-dependent not particular to the actual cascading watchdog timers.

The foregoing disclosure and description of the invention area explanatory and illustrative, thereof, and various

We claim:

What is claimed is:

1. A circuit arrangement comprising:
   a first watchdog timer circuit having an input and an output;
   a second watchdog timer circuit having an input and an output; and
   a switching system operatively interconnecting the output and the input of the first watchdog timer circuit to the input of the second watchdog timer circuit.

2. The circuit arrangement of claim 1 wherein the switching
   system includes a MUX (multiplexer); and
   a latch whose output is connected to the control terminal of said MUX and input connected to the output of said first watchdog timer circuit.

3. A circuit arrangement comprising:
   a first watchdog timer circuit having an input and an output;
   a second watchdog timer circuit having an input and an output; and
   a switching system, including a MUX and a latch whose output is connected to the control terminal of said MUX, operatively interconnecting the output and the input of the first watchdog timer circuit to the input of the second watchdog timer circuit;
   a clock source coupled to the MUX; and
   an ASIC or PLD or FPGA coupled to the MUX and the input of the first watchdog timer circuit.

4. A system including:
   a processor;
   a first circuit arrangement responsive to signals outputted from said processor to generate an interrupt signal causing the processor to execute predefined computer code that identifies entities whose contents are to be logged;
   a switching system having an output and input wherein said input operatively coupled to an output and an input of said first circuit arrangement; and
   a second circuit arrangement having an input connected to the output of said switching system, said switching system being responsive to signals at the output of said first circuit arrangement and no signals from said processor within a predefined time interval to cause said second circuit arrangement to generate a reset signal to reset said processor.

5. The system of claim 4 further including a subsystem operatively coupled to the processor, said subsystem having circuits operatively coupled to provide at least one desired function.

6. The system of claim 5 wherein the at least one desired function includes packet routing.

7. The system of claim 4 wherein the first circuit arrangement includes a first watchdog timer circuit.

8. The system of claim 7 wherein the second circuit arrangement includes a second watchdog timer circuit.

9. The system of claim 8 wherein the switching system includes a latch and a MUX, wherein the latch has an input connected to an output of the first watchdog timer circuit and an output connected to a control terminal of said MUX and said MUX having an output connected to an input of the second watchdog circuit and two inputs one of which is connected to the input of said first watchdog timer.

10. The system of claim 9 further including a field programmable gate array (FPGA) operatively coupled to one of the two inputs of the MUX; and
    a clock source operatively connected to another of the two inputs of the MUX.

* * * * *